L. P. NICHOLS.
WINDOW REFRIGERATOR.
APPLICATION FILED JAN. 15, 1912.
1,036,888.
Patented Aug. 27, 1912.
2 SHEETS—SHEET 1.
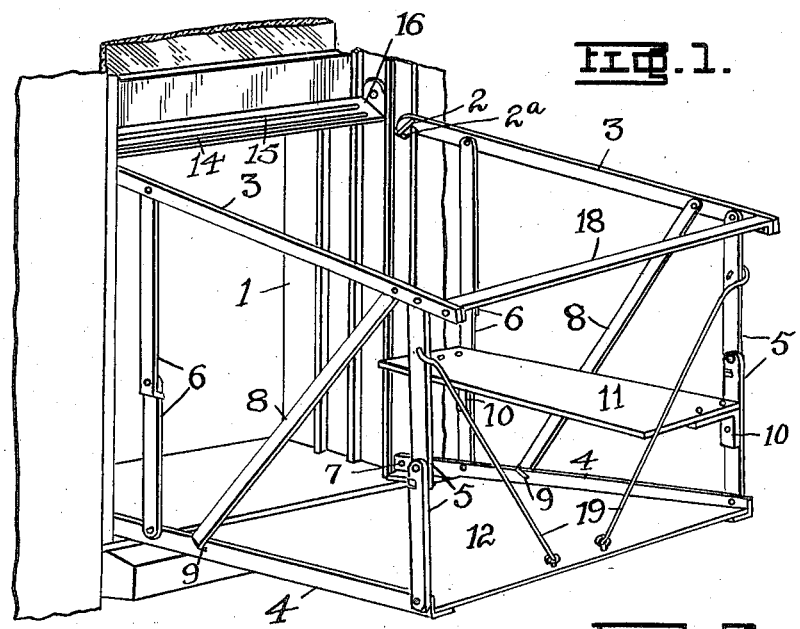
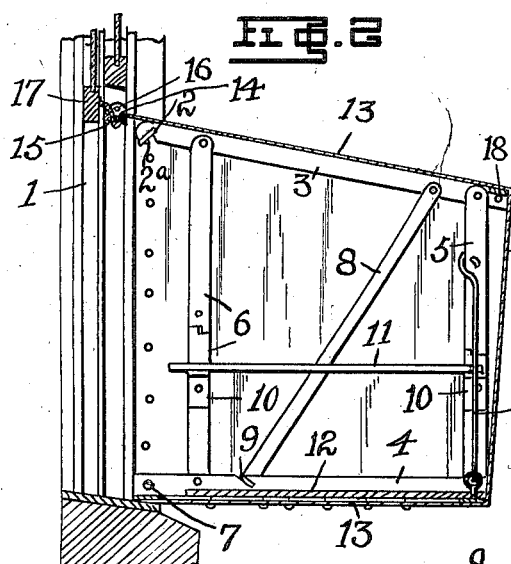
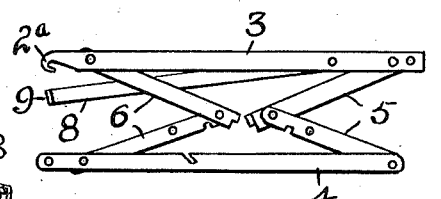
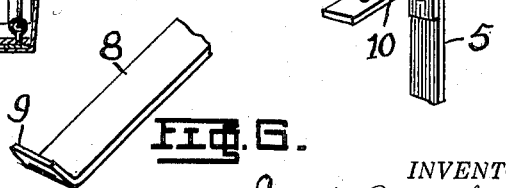
WITNESSES:
Robt F. Dilworth
Elva Staniek
INVENTOR.
Lewis P. Nichols,
BY F. N. Barber
ATTORNEY.

L. P. NICHOLS.
WINDOW REFRIGERATOR.
APPLICATION FILED JAN. 15, 1912.
1,036,888.
Patented Aug. 27, 1912.
2 SHEETS—SHEET 2.
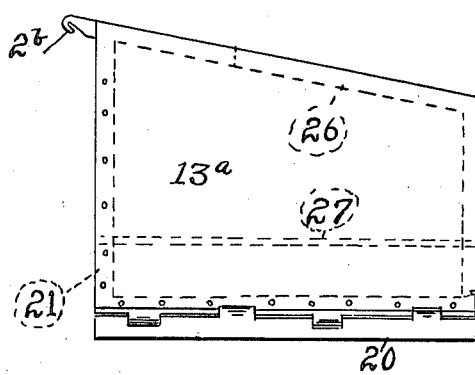
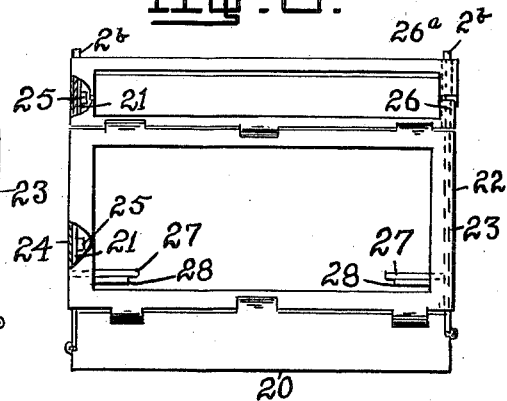
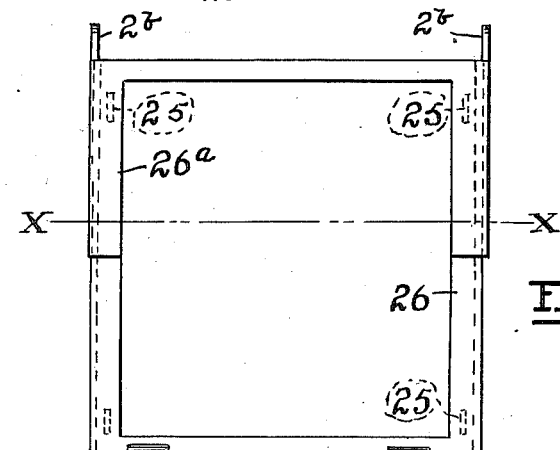
WITNESSES:
INVENTOR.
Lewis P. Nichols
BY F. N. Barber
ATTORNEY.

UNITED STATES PATENT OFFICE.

LEWIS P. NICHOLS, OF PITTSBURGH, PENNSYLVANIA.

WINDOW-REFRIGERATOR.

1,036,888.  Specification of Letters Patent.  Patented Aug. 27, 1912.

Application filed January 15, 1912. Serial No. 671,158.

*To all whom it may concern:*

Be it known that I, LEWIS P. NICHOLS, a citizen of the United States, residing at Pittsburgh, in the county of Allegheny and State of Pennsylvania, have invented new and useful Improvements in Window-Refrigerators, of which the following is a specification.

My invention relates to window refrigerators and its object is to provide a refrigerator of this type which may be readily connected to a window or other opening and disconnected therefrom and which may be folded into a small compact form for storage or shipment.

Referring to the accompanying sheets of drawing, Figure 1 is a perspective of the frame of one of my improved refrigerators applied to a window; Fig. 2, a vertical section of my invention complete and adjacent parts of a window; Fig. 3, a side elevation of one side frame partly folded; Fig. 4, a perspective view of the canvas holding device; Fig. 5, a perspective of a portion of the frame with a shelf-bracket thereon; Fig. 6, a perspective of one end of the frame brace; Fig. 7, a side view of a second form of my invention; Fig. 8, an end view thereof with parts broken away; Fig. 9, an end view with the sides extending outwardly to show the shelves and their manner of folding; Fig. 10, a section on the line X—X, Fig. 9, the parts beyond being omitted; and Fig. 11, a view of one corner of the frame showing a hinged bracket and shelf.

Referring first to Figs. 1 to 6, 1 represents a window casing, having in its opposite sides the headed studs 2, over the shanks of which the hooks or inclined notches 2ª in the lower sides of the inner ends of the upper frame-bars 3 are positioned. These bars are parallel and extend downwardly and away from the window. The outer end of each bar 3 is connected to a lower frame-bar 4 by the two toggle links 5, that is, by a pair of links, one end of one link being pivoted to an upper bar 3, one end of the other link being pivoted to a lower bar 4, and the remaining ends of the links being pivoted to each other. Each lower bar 4 extends from its respective link 5 inwardly toward the window in substantially the same vertical plane as its companion bar 3 above it. The inner end of each upper bar 3 is connected with its companion lower bar 4 by the toggle links 6. It is seen that I provide a pair of vertical side frames, each composed of a pair of upper and lower bars, connected at their ends by toggle-links. The inner ends of the lower bars 4 are secured to the sides of the window casing or other support by any suitable means, as the screws 7. The outer ends of the frames may be held by various means in their normal position, that is, projecting outwardly with the lower bars nearly horizontal or inclined slightly, but I have provided the two braces 8 pivoted respectively to the outer portions of the upper bars 3 of each frame and having their outer ends provided each with an inturned hook 9 in the inclined notch in the middle portion of the upper edge of the lower bar of the frame. To the inner face of the lower members of the toggle links of one frame, I secure the brackets 10, on which I place the shelf 11, removably connected to the brackets. The lower bars 4 are L-bars with their horizontal flanges or members projecting toward each other to form supports for the ends of the floor 12. 13 represents a canvas or other cover for the frames, the canvas extending across the tops of both frames and down over the sides of the frames and over the ends of the frames, the lower edges of the canvas being secured to the bottom of the floor. The inner end of the canvas beyond the upper bars 3 is threaded down through the slot 14 and then up through the parallel slot 15 in the horizontal cross bar 16 having its ends secured to the sides of the window casing. The end of the canvas extends beyond the bar 16 so as to reach the pane when the sash is down, or the lower rail 17 when the sash is up. The outer upper corners of the frames are connected together by the horizontal tie 18, on which the canvas rests. The frames are prevented from lateral movement by the braces 19 which extend from the upper part of each frame to fastenings in the outer end of the floor. By removing the screws 7, the refrigerator may be lifted off from the supports 2, and, after the braces 8 have been lifted out of their notches and the shelf has been removed, the toggle links may be bent toward each other and the upper and lower bars of the frames may be folded together, Fig. 3 showing the frames partially folded.

Referring now to Figs. 7 to 11, 20 represents a sheet metal base or floor of a second form of my invention, having its lateral edges turned up vertically, to which are hinged the open or skeleton sides 21 and 22 of my refrigerator. The sides form frames similar in appearance to the sides of my first form of invention hereinbefore described. The outer ends of the sides are shorter than the inner ends so that their top edges are inclined outwardly and downwardly, and their inner upper corners are provided with the hooks 2ᵇ, by which the sides may be hung on supports such as shown at 2 on Fig. 1. The outer end of the base 20 has hinged thereto the skeleton metal back or end frame 23, which rests against the outer ends of the sides 21 and 22 and has the side flanges 24 extending over the outer faces of the sides. The end 23 has the lugs 25 which engage the inner faces of the sides and prevent their moving toward each other. The upper edge of the end 23 has hinged thereto the skeleton top or frame 26, having side flanges fitting over the sides 21 and 22. The upper or inner end of the top frame 26 is made in two sections, the upper section 26ᵃ being slidable over the lower as shown in Fig. 10. The canvas cover 13ᵃ extends over the top, side and end frames, but it is clear that the top, sides, and end may be made without removing the central portions, in which case the canvas or like cover may be omitted. Sheet-metal shelves 27 are hinged to the sides 21 and 22, and are normally supported by the brackets 28, also hinged to the sides. The bottom or base has its side and end edges extending upwardly at such distances that the sides and the end hinged thereon will permit the side 21 to fold down on the base 20 after its shelf and bracket have been folded; the side 22 to fold down on the side 21 after its shelf and bracket have been folded; and the end and top to fold down on the side 22, the section 26ᵃ being slid down on the other section of the top 26 so that the top will not extend beyond the bottom 20.

I claim—

1. In a window refrigerator, a pair of vertical side frames, means for detachably connecting them to a window, each frame composed of upper and lower bars and toggle-links connecting them, and a cover extending from the top of one frame to the other and downwardly over the sides and ends thereof, the sides and end of the cover being flexible so that, when the toggle-links are flexed the upper bars of the frames may be collapsed toward the lower bars of the same.

2. In a window refrigerator, a pair of vertical side frames, means for detachably connecting them to a window, each frame composed of upper and lower bars and toggle-links connecting them, means for preventing the toggles from flexing, and means to prevent side movement of the upper outer ends of the frames.

3. In a window refrigerator, a window casing, a pair of vertical frames projecting from each side of the casing, a flexible cover for the frames, and a cross-bar connecting the sides of the window casing, and having a horizontal slot, in which the inner end of the cover is supported.

4. In a window refrigerator, a pair of vertical side frames, each composed of upper and lower bars and toggle-links connecting them, means for detachably connecting the inner ends of the bars to the window casing, and a cover for the frames and the space between and below the upper bars.

Signed at Pittsburgh, Pa., this 10″ day of January, A. D. 1912.

LEWIS P. NICHOLS.

Witnesses:
 ALICE E. DUFF,
 ELVA STANICK.